United States Patent
Sullivan et al.

(10) Patent No.: US 6,705,559 B1
(45) Date of Patent: Mar. 16, 2004

(54) PROGRAMMABLE SEAT BELT DAMPER ASSEMBLY

(75) Inventors: John L. Sullivan, Ann Arbor, MI (US); John Matthew Ginder, Plymouth, MI (US); Kirsten Marie Carr, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 09/332,070

(22) Filed: Jun. 14, 1999

(51) Int. Cl.$^7$ .............................................. B60R 22/34
(52) U.S. Cl. ........................ 242/381; 280/805; 280/807
(58) Field of Search .............................. 242/381, 384, 242/396.6; 280/805, 806, 807; 297/476, 477, 478

(56) References Cited

U.S. PATENT DOCUMENTS

| | | | |
|---|---|---|---|
| 4,815,674 A | * 3/1989 | Blake et al. ................. 242/381 |
| 5,257,681 A | 11/1993 | Shtarkman et al. | |
| 5,277,281 A | 1/1994 | Carlson et al. | |
| 5,652,704 A | 7/1997 | Catanzarite | |
| 5,794,878 A | 8/1998 | Carpenter et al. | |
| 5,816,372 A | 10/1998 | Carlson et al. | |
| 5,873,599 A | * 2/1999 | Bauer et al. ................. 280/806 |
| 6,019,392 A | * 2/2000 | Karlow ........................ 280/806 |

FOREIGN PATENT DOCUMENTS

DE      2215892     * 10/1973

* cited by examiner

Primary Examiner—John Q. Nguyen
(74) Attorney, Agent, or Firm—David B. Kelley

(57) ABSTRACT

A programmable seat belt damper assembly for a seat belt in a motor vehicle. The programmable seat belt damper assembly includes a retractor operatively connected to the seat belt for winding and unwinding the seat belt. The programmable seat belt damper assembly also includes a rotary damper operatively connected to the retractor and having a magneto-rheological (MR) fluid therein. The programmable seat belt damper assembly further includes a controller electrically connected to the rotary damper to control an apparent viscosity of the MR fluid to increase and decrease a damping torque of the rotary damper for the unwinding of the seat belt.

18 Claims, 2 Drawing Sheets

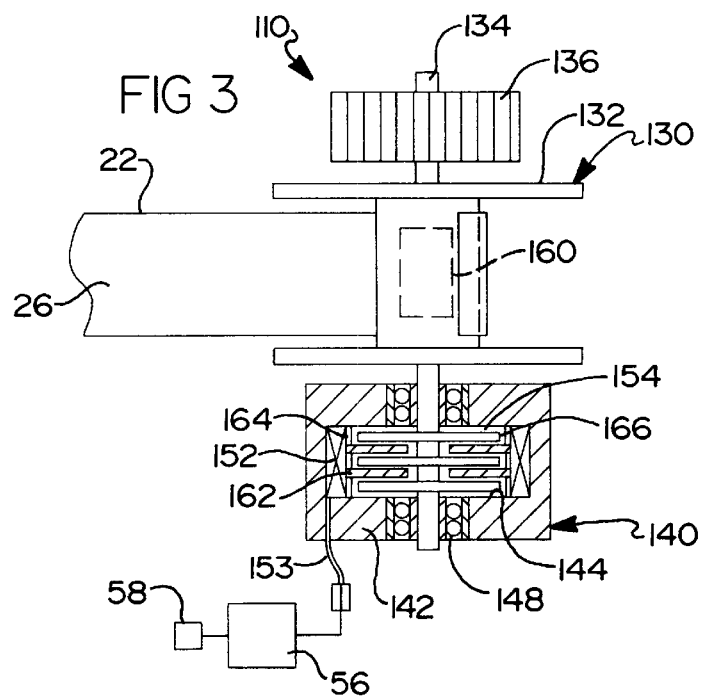
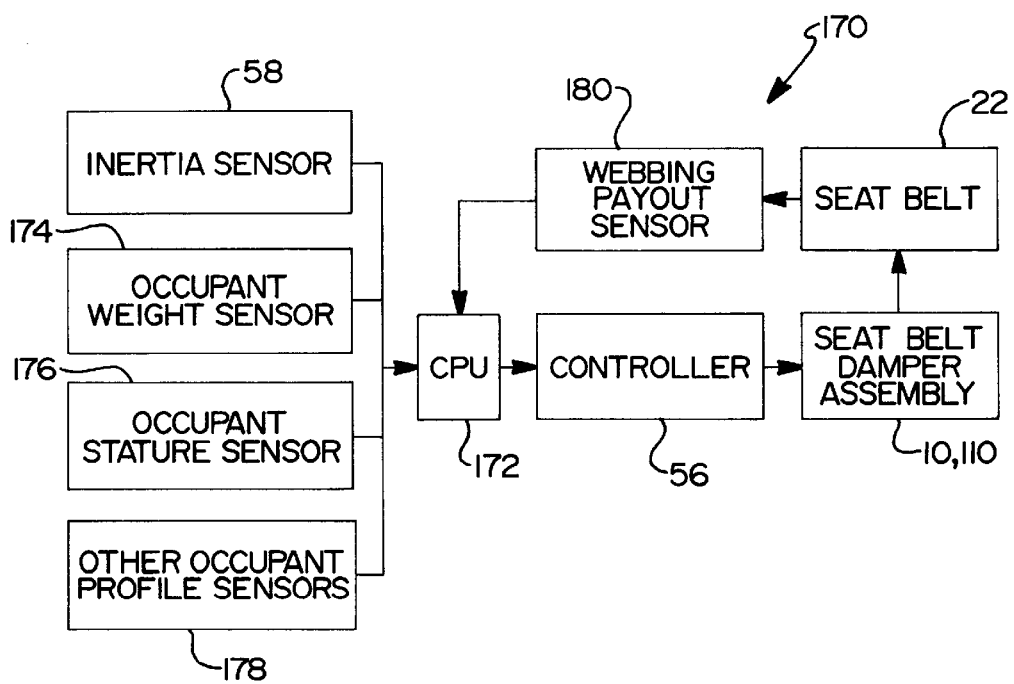

PROGRAMMABLE SEAT BELT DAMPER ASSEMBLY

BACKGROUND OF THE INVENTION

1. Field of the Invention

The present invention relates generally to seats for motor vehicles and, more specifically, to a programmable seat belt damper assembly for a motor vehicle.

2. Description of the Related Art

It is known to provide seats for a motor vehicle. It is also known to provide a restraint system such as a seat belt to restrain an occupant in a seat of the motor vehicle. Typically, the restraint system includes a retractor attached to the seat or vehicle structure and having a spool attached to the seat belt. The spool is rotatably mounted to the retractor by a shaft. The retractor has a spiral spring on one end of the shaft to urge the spool in a direction for retracting the seat belt when not in use. Also, the retractor has a toothed sprocket on the other end of the shaft and a locking pawl to engage the sprocket to lock the shaft against rotation in the other direction to prevent belt unwinding. The locking pawl is typically operated by an inertia sensing mechanism coupled to an electrical actuator.

Although the above seat belt retractors have worked well, it is desirable to reduce occupant kinetic energy during a vehicle impact through programmed and limited seat belt pay out. It is also desirable to reduce seat back stiffness requirements of an integrated seat. Therefore, there is a need in the art to provide a programmable seat belt damper assembly for a motor vehicle.

SUMMARY OF THE INVENTION

Accordingly, the present invention is a programmable seat belt damper assembly for a seat belt in a motor vehicle. The programmable seat belt damper assembly includes a retractor operatively connected to the seat belt for winding and unwinding the seat belt. The programmable seat belt damper assembly also includes a rotary damper operatively connected to the retractor and having a magneto-rheological (MR) fluid therein. The programmable seat belt damper assembly further includes a controller electrically connected to the rotary damper to control an apparent viscosity of the MR fluid to increase and decrease a damping torque of the rotary damper for the unwinding of the seat belt.

One advantage of the present invention is that a programmable seat belt damper assembly is provided for a motor vehicle. Another advantage of the present invention is that the programmable seat belt damper assembly has a magneto-rheological damper for a seat belt. Yet another advantage of the present invention is that the programmable seat belt damper assembly permits limited highly damped torso travel to reduce occupant kinetic energy. Still another advantage of the present invention is that the programmable seat belt damper assembly reduces the seat back stiffness requirements of an integrated seat.

Other features and advantages of the present invention will be readily appreciated, as the same becomes better understood after reading the subsequent description taken in conjunction with the accompanying drawings.

BRIEF DESCRIPTION OF THE DRAWINGS

FIG. 3 is a fragmentary plan view of another embodiment, according to the present invention, of the programmable seat belt damper assembly of FIG. 1.

FIG. 4 is a schematic diagram of a control system for the programmable seat belt damper assembly of FIGS. 1 through 3.

DESCRIPTION OF THE PREFERRED EMBODIMENT(S)

Figure 1:
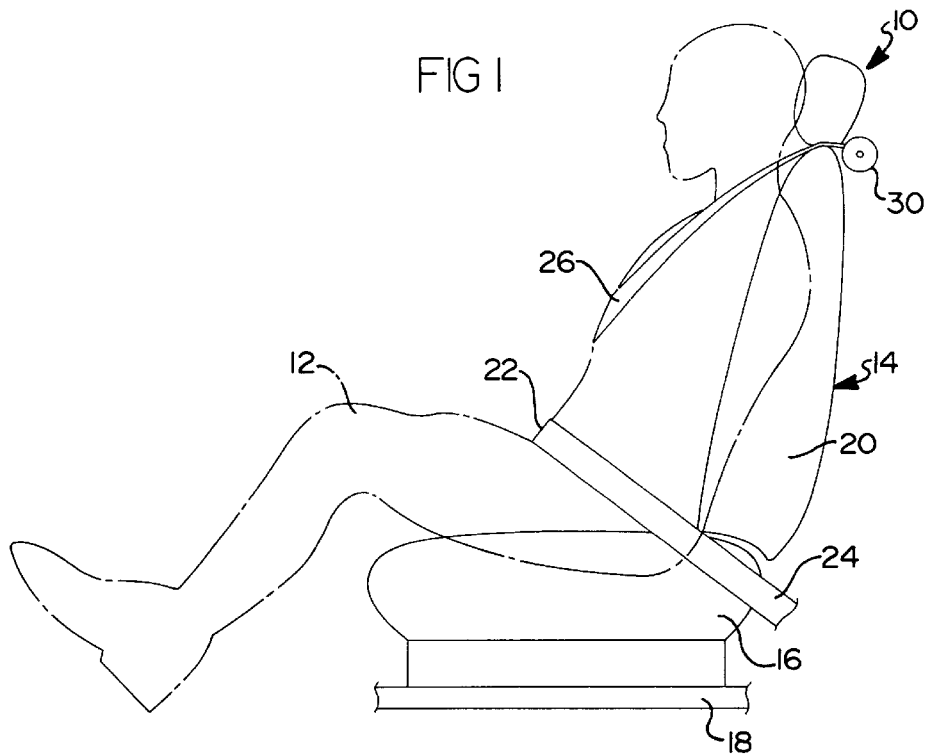
FIG. 1 is an elevational view of a programmable seat belt damper assembly, according to the present invention, illustrated in operational relationship with a seated occupant.
Figure 2:
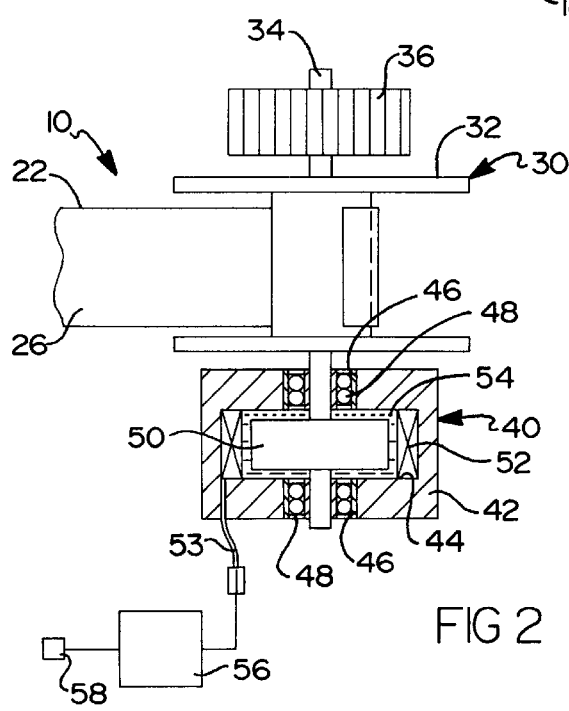
FIG. 2 is a fragmentary plan view of the programmable seat belt damper assembly of FIG. 1.

Referring to the drawings and in particular FIGS. 1 and 2, one embodiment of a programmable seat belt damper assembly 10, according to the present invention, is illustrated for an occupant 12 seated in a seat, generally indicated at 14, in an occupant compartment of a motor vehicle (not shown). The seat 14 has a seat portion 16 operatively connected to vehicle structure 18 such as a floor pan. The seat 14 also includes a back portion 20 pivotally connected to the seat portion 16 by suitable means such as a pivot pin (not shown). It should be appreciated that the seat 14 is conventional and known in the art.

The programmable seat belt damper assembly 10 includes a seat belt 22. The seat belt 22 has a lap portion 24 with one end connected by suitable means (not shown) to vehicle structure. The seat belt 22 also has a shoulder portion 26 having one end connected to the other end of the lap portion 24. These ends of the lap portion 24 and shoulder portion 26 are attached to a latch member (not shown) for latching and unlatching with a latch (not shown). The shoulder portion 26 is attached to a retractor 30 to be described.

Referring to FIGS. 1 and 2, the programmable seat belt damper assembly 10 also includes a retractor, generally indicated at 30, connected to the seat belt 22. The retractor 30 includes a take-up spool 32 connected by suitable means such as an adhesive to the end of the shoulder portion 26. The retractor 30 also includes a shaft 34 extending through a housing (not shown) and the take-up spool 32 such that the take-up spool 32 is rotatable relative to the housing. It should be appreciated that the housing is attached by suitable means (not shown) to either the back portion 20 of the seat 14 or vehicle structure (not shown).

The retractor 30 also includes a spring 36 disposed about one end of the shaft 34. The spring is of a spiral type having one end attached to the shaft 34 and another end connected to the housing as known in the art. The spring 36 urges the shaft 34 in a predetermined direction to wind up the seat belt 22 on the take-up spool 32.

The programmable seat belt damper assembly 10 also includes a rotary damper, generally indicated at 40, attached to and disposed about the other end of the shaft 34. The rotary damper 40 includes a housing 42 disposed about and spaced radially from the shaft 34. The housing 42 has a cavity 44 with axial open ends 46 to form a generally "C" shaped cross-section at each end. The housing 42 is made of a ferrous material. The housing 42 is attached by suitable means (not shown) to either the back portion 20 of the seat 14 or vehicle structure.

The rotary damper 40 includes a bearing 48 disposed about the shaft 34 and in each open end 46 of the housing 42. The bearing 48 is of a sealed roller type to allow rotation of the shaft 34 relative to the housing 42.

The rotary damper 40 also includes a driven member 50 disposed within the cavity 44 of the housing 42 and about the shaft 34. The driven member 50 is generally circular in shape. The driven member 50 is made of a ferrous material. The driven member 50 is fixed to the shaft 34 by suitable means such as a key (not shown).

The rotary damper 40 also includes a coil 52 disposed within the cavity 44 of the housing 42 and about the driven member 50. The coil 52 is spaced a predetermined distance from the driven member 50. The coil 52 is connected by suitable means such as wires 53 to a source of power such as a controller 56 to be described.

The rotary damper 40 further includes a magneto-rheological (MR) fluid 54 disposed in the cavity 44 of the housing 42 between the driven member 50, the coil 52 and the bearings 48. The MR fluid 54 contains magnetizable particles such as carbonyl iron spheroids of about one (1) to ten (10) microns in diameter dispersed in a viscous fluid such as silicone oil which has a viscosity of between about 20 and 50,000 mPa. It should be appreciated that the MR fluid 54 may also contain surfactants, flow modifiers, lubricants, viscosity enhancers, and other additives. It should also be appreciated that the MR fluid 54 is conventional and known in the art.

The programmable seat belt damper assembly 10 includes a controller 56 such as a restraint control module connected by the wires 53 to the coil 52. The controller 56 is programmable to send various amount of current to the rotary damper 40. The damping rate of the MR fluid 54 is programmed by the controller 56 based on various factors such as mass, stature, location and possibly age of the occupant 12 and the inertia sensed.

The programmable seat belt damper assembly 10 includes an inertia sensor 58 connected to the controller 56. The inertia sensor 58 sends a signal to the controller 56 of the amount of inertia sensed. It should be appreciated that the controller 56 and inertia sensor 58 are conventional and known in the art.

In operation of the programmable seat belt damper assembly 10, the seat belt 22 may be unwound by the occupant 12 from the retractor 30 and latched to restrain the occupant in the seat 12 as illustrated in FIG. 1. Under normal driving conditions, the rotary damper 40 is inactive and the retractor 30 operates as a conventional retractor, except without an inertia latch. When an impact collision condition occurs as sensed by the inertia sensor 58, a signal is sent to the controller 56. The controller 56 send a signal to the rotary damper 40 to pass a current through the coil 52 to generate a magnetic field. The magnetic field increases the apparent viscosity of the MR fluid 54 and thus increases the damping rate or torque generated by the rotary damper 40. The increased viscosity of the MR fluid 54 permits some highly damped occupant torso travel during the impact, thus reducing the kinetic energy of the occupant 12. It should be appreciated that the amount of current passed through the coil 52 is programmable by the controller 56, thus affecting the strength of the magnetic field and viscosity of the MR fluid 54.

Referring to FIG. 3, another embodiment 110, according to the present invention, of the programmable seat belt damper assembly 10 is shown. Like parts of the programmable seat belt damper assembly 10 have like reference numerals increased by one hundred (100). In this embodiment, the retractor 130 of the programmable seat belt damper assembly 110 may include a torsion bar 160 disposed on the same shaft 134 as the rotary damper 140. The torsion bar 160 is rated at the lowest level of a desired load limiting level. The rotary damper 140 controls the load limiting from the lowest level to the desired load limiting level depending upon the occupant and impact conditions. It should be appreciated that the torsion bar 160 is conventional and known in the art.

The programmable seat belt damper assembly 110 also includes an inertia latch (not shown) as is currently used with conventional load limiters. It should be appreciated that the inertia latch is conventional and known in the art.

The programmable seat belt damper assembly 110 includes the rotary damper 140. The rotary damper 140 may be similar to the rotary damper 40 or may include at least one, preferably a plurality of first or fixed discs 162 spaced axially and disposed about the shaft 134. The first discs 162 are generally circular in shape. The first discs 162 are fixed relative to the shaft 134 by a key 164 extending axially. The key 164 is disposed in the cavity 144 and connected to the housing 142. It should be appreciated that the first discs 162 do not rotate.

The rotary damper 140 includes at least one, preferably a plurality of second or driven discs 166 with one of the second discs 166 being disposed between an adjacent pair of the first discs 162. The second discs 166 are spaced axially and disposed about the shaft 134. The second discs 166 are generally circular in shape and connected to the shaft 134 by suitable means such as a spline connection. It should be appreciated that the first and second discs 162 and 166 produce the torque required for lock-up.

Referring to FIG. 4, a control system 170, according to the present invention, is shown for the programmable seat belt damper assembly 10,110. The control system 170 may include a central processing unit (CPU) 172 interconnecting the controller 56 and the inertia sensor 58. In this embodiment, the CPU 172 is optional and used to gather data and make a control profile for the controller 56 to execute. The control system 170 may also include at least one, preferably a plurality of sensors such as an occupant weight sensor 174, occupant stature sensor 176 and other occupant profile sensors 178 connected to the CPU 172. The sensors 174, 176 and 178 may be mounted in the seat 14 or a roof rail (not shown) or headliner (not shown) of the motor vehicle to provide information about the occupant 12 seated in the seat 14. The control system 170 also includes the controller 56 connected to the CPU 172 and to the rotary damper 40,140 of the programmable seat belt damper assembly 10,110. The rotary damper 40,140 is operatively connected to the seat belt system or seat belt 22. The control system 170 may further includes a webbing payout sensor 180 interconnecting the seat belt 22 and the CPU 172. The webbing payout sensor 172 acts as a back-up redundant sensor to cooperate with the inertia sensor 58 to ensure proper performance of the control system 170. The webbing payout sensor 180 may be located in the recliner mechanism (not shown) for the seat 14. It should be appreciated that the webbing payout sensor 180 provides an indication of the amount of seat belt paid-out from the take-up spool 32,132. It should also be appreciated that the webbing payout sensor 180 is conventional and known in the art.

In operation of the control system 170, the sensors 174, 176,178 provide signals to the CPU 172 regarding the occupant. Upon an impact on the motor vehicle, the inertia sensor 58 provides a signal to the CPU 172 of vehicle impact conditions. The CPU 172 provides a signal to the controller 56 that controls the rotary damper 40,140, in turn, controlling the payout of the seat belt 22. The webbing pay-out sensor 180 provides a signal to the CPU 172 of the amount of pay-out of the seat belt 22 which is then communicated to the controller 56 to control the rotary damper 40,140.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A programmable seat belt damper assembly for a seat belt in a motor vehicle comprising:

a retractor operatively connected to a seat belt for winding and unwinding the seat belt;

a rotary damper operatively connected to said retractor and having a magneto-rheological (MR) fluid therein; and a controller electrically connected to said rotary damper and being programmable based on predetermined factors to send a signal thereto to generate a magnetic field to increase an apparent viscosity of said MR fluid to increase a damping torque of said rotary damper during an impact collision condition based on the predetermined factors, wherein the increased viscosity of the MR fluid permits some unwinding of the seat belt for highly damped occupant torso travel during the impact to reduce a kinetic energy of an occupant.

2. A programmable seat belt damper assembly as set forth in claim 1 wherein retractor has a rotatable shaft, said rotary damper being mounted about one end of said shaft.

3. A programmable seat belt damper assembly as set forth in claim 2 wherein said retractor has a take-up spool mounted on said shaft and connected to said seat belt.

4. A programmable seat belt damper assembly as set forth in claim 3 wherein said retractor includes a spring attached to another end of said shaft.

5. A programmable seat belt damper assembly as set forth in claim 2 wherein said rotary damper includes a housing disposed about and spaced from said shaft and having a cavity with open axial ends.

6. A programmable seat belt damper assembly as set forth in claim 5 wherein said rotary damper includes at least one driven member disposed in said cavity on and about said shaft.

7. A programmable seat belt damper assembly as set forth in claim 6 wherein said rotary damper includes a bearing disposed about said shaft and in each open axial end of said housing.

8. A programmable seat belt damper assembly as set forth in claim 7 wherein said rotary damper includes a coil disposed in said cavity and about said driven member and electrically connected to said controller.

9. A programmable seat belt damper assembly as set forth in claim 1 including an inertia sensor electrically connected to said controller to sense inertia of the motor vehicle.

10. A programmable seat belt damper assembly as set forth in claim 1 including at least one occupant sensor electrically connected to said controller to sense a profile of an occupant seated in the motor vehicle.

11. A programmable seat belt damper assembly for a motor vehicle comprising:

a seat belt;

a retractor operatively connected to said seat belt for winding and unwinding said seat belt;

a rotary damper operatively connected to said retractor and having a magneto-rheological (MR) fluid therein; and a controller electrically connected to said rotary damper and being programmable based on predetermined factors to send a signal thereto to generate a magnetic field to increase an apparent viscosity of said MR fluid to increase a damping torque of said rotary damper during an impact collision condition based on the predetermined factors, wherein the increased viscosity of the MR fluid permits some unwinding of said seat belt for highly damped occupant torso travel during the impact to reduce a kinetic energy of an occupant.

12. A programmable seat belt damper assembly as set forth in claim 11 wherein retractor has a rotatable shaft, said rotary damper being mounted about one end of said shaft.

13. A programmable seat belt damper assembly as set forth in claim 12 wherein said rotary damper includes a bearing disposed about said shaft and in each open axial end of said housing.

14. A programmable seat belt damper assembly as set forth in claim 12 wherein said rotary damper includes a coil disposed in said cavity and about said driven member.

15. A programmable seat belt damper assembly as set forth in claim 12 wherein said rotary damper includes a housing disposed about and spaced from said shaft and having a cavity with open axial ends.

16. A programmable seat belt damper assembly as set forth in claim 15 wherein said rotary damper includes at least one driven member disposed in said cavity and about said shaft.

17. A programmable seat belt damper assembly as set forth in claim 11 including an inertia sensor electrically connected to said controller to sense inertia of the motor vehicle.

18. A programmable seat belt damper assembly for a motor vehicle comprising:

a seat belt;

a retractor having a rotatable shaft and a take-up spool on said shaft and connected to said seat belt for winding and unwinding said seat belt;

a rotary damper disposed about said shaft, said rotary damper having a housing with a cavity, a coil disposed in said cavity, a magneto-rheological (MR) fluid disposed in said cavity and a driven member made of a ferrous material connected to said shaft and disposed in said cavity within said coil; and a controller electrically connected to said coil of said rotary damper and being programmable based on predetermined factors to send a signal thereto to generate a magnetic field to increase an apparent viscosity of said MR fluid to increase a damping torque of said driven member during an impact collision condition based on the predetermined factors, wherein the increased viscosity of the MR fluid permits some unwinding of said seat belt for highly damped occupant torso travel during the impact to reduce a kinetic energy of an occupant.

* * * * *